(No Model.)

B. DALE.
INLET VALVE FOR FLUSH TANKS.

No. 605,084. Patented June 7, 1898.

Witnesses

Inventor
Bert Dale
by H. B. Willson & Co.
Attorneys

UNITED STATES PATENT OFFICE.

BERT DALE, OF MILWAUKEE, WISCONSIN.

INLET-VALVE FOR FLUSH-TANKS.

SPECIFICATION forming part of Letters Patent No. 605,084, dated June 7, 1898.

Application filed October 6, 1897. Serial No. 654,238. (No model.)

*To all whom it may concern:*

Be it known that I, BERT DALE, a citizen of the United States, residing at Milwaukee, in the county of Milwaukee and State of Wisconsin, have invented certain new and useful Improvements in Inlet-Valves for Flush-Tanks; and I do declare the following to be a full, clear, and exact description of the invention, such as will enable others skilled in the art to which it appertains to make and use the same.

My invention has relation to an inlet-valve for flush-tanks.

The object of the invention is to provide a simple, durable, and inexpensive valve which may be easily adjusted to regulate the supply of water to said tank and which may be easily taken apart for the purpose of cleaning or repair.

With this object in view the invention consists of certain features of construction and combination of parts which will be hereinafter fully described and claimed.

Figure 1:
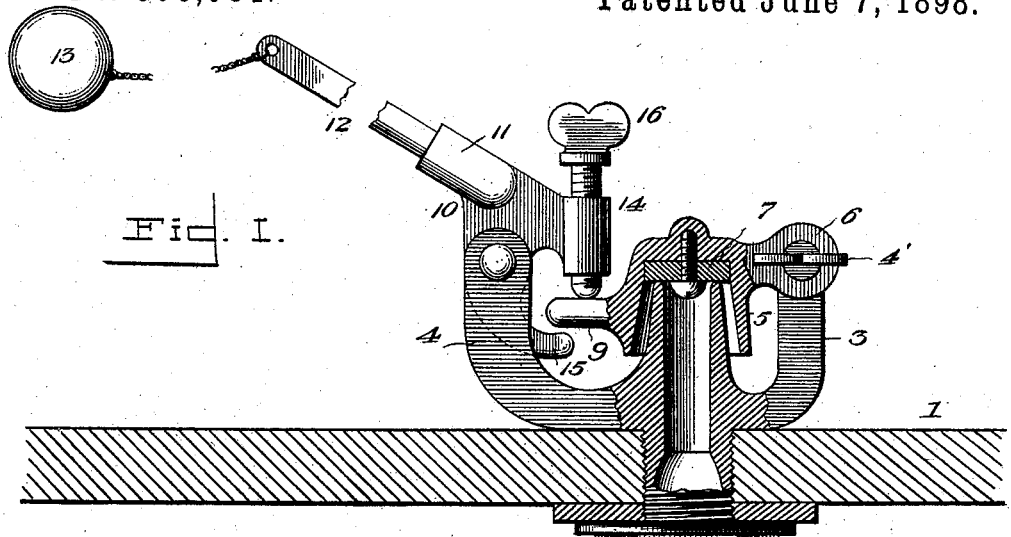
Figure 2:
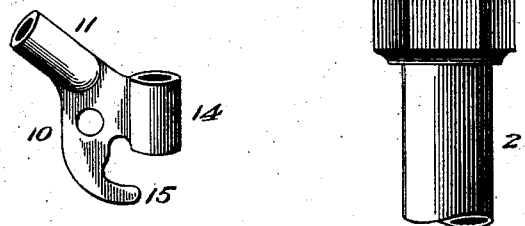
Figure 3:
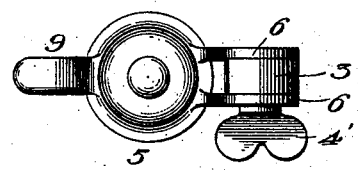

In the accompanying drawings, Figure 1 is a vertical sectional view taken through the tank and showing my improved valve in elevation and partly in section. Fig. 2 is a detail perspective view of the valve-operating lever; and Fig. 3 is a top view of the valve, showing its connection with the inlet-pipe.

In said drawings, 1 denotes the tank, and 2 the inlet-pipe, which is secured to the tank in any suitable manner and which projects upwardly within the interior of the tank. The end of the tube within the tank is provided on one side with an upwardly-extending arm 3 and on the other side with an upwardly-extending arm 4.

5 denotes the valve, which is cup-shaped and which is provided with parallel ears 6, that are pivoted to the arm 3 by a thumb-screw 4'. The valve is provided with a washer 7, which is held in place by a screw 8, and is also provided with a laterally-projecting arm 9.

10 denotes the valve-actuating lever, which is provided with a portion 11, that receives the screw-threaded end of a rod 12, supporting a float-valve 13. The lever is also provided with a screw-threaded sleeve 14 and with a lifting-toe 15. A set-screw 16 is worked through the sleeve 14 and is adapted to regulate the amount of water supplied to the tank.

In operation when the tank has been emptied of its contents the float will lower with the water. The toe 15 of the valve-actuating mechanism will engage the arm 9 of the valve, elevate the valve from its seat, and allow the water to flow into the tank. As the water flows into the tank the float will be elevated and will depress the tubular end 14 of the valve-actuating lever and force the end of the set-screw 16 down upon the lug 9 and close the valve upon its seat. It will of course be understood that by regulating this lever the float may have a greater or less movement, which will greatly increase or diminish the water-supply in the tank.

Should it be desired to remove the washer from the valve to replace it with a new one, the thumb-screw 4' is removed and the valve disconnected, the washer taken off, and a new one put in its place.

Although I have specifically described the construction and relative arrangement of the several elements of my invention, I do not desire to be confined to the same, as such changes or modifications may be made as clearly fall within the scope of my invention without departing from the spirit thereof.

Having thus described my invention, what I claim, and desire to secure by Letters Patent, is—

The combination with an inlet-pipe for a flush-tank, said pipe having upwardly-extending arms on its opposite sides, a cup-valve pivoted to one of said arms and provided with a lug, a lever pivoted to the other arm and provided with a toe projecting under said lug and with a screw projecting over said lug, and a float connected with the lever, whereby when the float is elevated the valve will be closed, and when lowered it will be opened, substantially as set forth.

In testimony whereof I hereunto affix my signature in presence of two witnesses.

BERT DALE.

Witnesses:
 RICHARD ELSNER,
 EMMA ELSNER.